(12) United States Patent
Harada et al.

(10) Patent No.: US 8,134,983 B2
(45) Date of Patent: Mar. 13, 2012

(54) BASE STATION, MOBILE STATION, AND METHOD OF COMMUNICATING FOR CONTROLLING A TRANSMISSION TIME INTERVAL

(75) Inventors: Atsushi Harada, Kawasaki (JP); Minami Ishii, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 491 days.

(21) Appl. No.: 12/305,134

(22) PCT Filed: Jun. 13, 2007

(86) PCT No.: PCT/JP2007/061872
§ 371 (c)(1),
(2), (4) Date: Mar. 20, 2009

(87) PCT Pub. No.: WO2007/148575
PCT Pub. Date: Dec. 27, 2007

(65) Prior Publication Data
US 2009/0175245 A1 Jul. 9, 2009

(30) Foreign Application Priority Data

Jun. 19, 2006 (JP) .................................. 2006-169446

(51) Int. Cl.
*H04J 3/00* (2006.01)
(52) U.S. Cl. ........ 370/336; 370/363; 370/301; 370/326; 370/345; 370/508; 455/181.1; 455/231
(58) Field of Classification Search ................. 370/336, 370/263, 301, 326, 345, 508; 455/181.1, 455/231
See application file for complete search history.

(56) References Cited

U.S. PATENT DOCUMENTS

2007/0104150 A1\* 5/2007 Fernandez-Corbaton et al. ............................. 370/335
2009/0268696 A1\* 10/2009 Olsson et al. ................. 370/336

OTHER PUBLICATIONS

International Search Report w/translation from PCT/JP2007/061872 dated Sep. 11, 2007 (3 pages).
Written Opinion from PCT/JP2007/061872 (3 pages).
3GPP TSG RAN1#45; "System Simulation Results with non-static TTI"; R1-061463; Shanghai, China, May 8-12, 2006 (5 pages).
3GPP TSG-RAN Joint WG1/WG2; "Increased TTI Length"; R2-060868; Athens, Greece, Mar. 27-31, 2006 (3 pages).

(Continued)

Primary Examiner — Jeffrey Pwu
Assistant Examiner — Abdelnabi Musa
(74) Attorney, Agent, or Firm — Osha Liang LLP (57) ABSTRACT

A disclosed base station apparatus includes: a TTI-length determining unit which determines, based on downlink receive quality information transmitted from a mobile station, whether data is to be transmitted in a first TTI with, as a unit, a predetermined period no shorter than a subframe length, or in a second TTI with, as a unit, a period shorter than the first TTI; a number-of-subframes determining unit which determines a number of subframes making up the determined TTI; a reporting unit which reports the determined TTI and the number of subframes making up the determined TTI to the mobile station; and
a scheduler which performs scheduling based on the determined TTI and the number of subframes making up the determined TTI.

6 Claims, 4 Drawing Sheets

OTHER PUBLICATIONS

3GPP TSG RAN WG1#44; "Variable TTI for LTE"; R1-060394; Denver, Colorado, USA; Feb. 13-17, 2006 (5 pages).

3GPP TS25.211, V7.0.0; "Physical channels and mapping of transport channels onto physical channels (FDD)"; Mar. 2006 (50 pages).

3GPP TS 25.214, V6.8.0; Physical layer procedures (FDD); Mar. 2006 (59 pages).

Motorola, R2-060122; "Layer 1 Data Transfer: Formats and Definitions"; 3GPP TSG RAN WG2#50; Sophia Antipolis, France; Jan. 9-13, 2006 (10 pages).

Motorola, R2-060944; "HARQ Considerations"; 3GPP TSG RAN WG2#52; Athens, Greece, Mar. 27-31, 2006 (15 pages).

* cited by examiner

| | SUBFRAME NUMBER |
|---|---|
| TTI-LENGTH SET 1 | 5, 10, 20 |
| TTI-LENGTH SET 2 | 1, 2, 3, 4 |

FIG.5

BASE STATION, MOBILE STATION, AND METHOD OF COMMUNICATING FOR CONTROLLING A TRANSMISSION TIME INTERVAL

BACKGROUND OF THE INVENTION

1. Field of the Invention

The present invention relates to base stations, mobile stations, and a method of communicating.

2. Description of the Related Art

In HSDPA (High speed downlink packet access), HS-PDSCH, which carries data traffic, is fixedly determined as 3 slots (2 msecs). (See Non-patent documents 1 and 2, for example.) In other words, in HSDPA, data is transferred from Layer 2 to Layer 1 with three slots as a unit.

Allocation of transmission opportunities in HSDPA is described below.

Each UE receives HS-SCCH, and, for allocation of transmission opportunities for an own UE, subsequent HS-PDSCH is received, and HS-DSCH is decoded. In HSDPA, if each UE fails in receiving HS-SCCH, as a base station can not transmit a reception acknowledgment for HS-DSCH, DTX is detected, and HS-DSCH is retransmitted.

On the other hand, in standardizing evolved UTRA, supporting a variable-length TTI (transmission time interval) is being proposed. (See Non-patent documents 3, 4, and 5, for example.)

Non-patent document 1
TS25.211 Section 7.8
Non-patent document 2
TS25.214 Section 6A.1.1
Non-patent document 3
Motorola, R2-060122, "Layer 1 Data Transfer Formats and Definitions", 3GPP TSG RAN WG2 #50 Sophia Antipolis, France. 9-13 Jan. 2006
Non-patent document 4
Ericsson, R2-060868, "Increased TTI Length", 3GPP TSG-RAN Joint WG1/WG2 Athens, Greece, 27-31 Mar. 2006
Non-patent document 5
Motorola, R2-060944, "HARQ Considerations", 3GPP TSG RAN WG2 #52 Athens, Greece, 27-31 Mar. 2006

SUMMARY OF THE INVENTION

Problem(s) to be Solved by the Invention

One of the objectives of a variable-length TTI is reducing the overhead of an L1/L2 control channel. From the point of view of reducing the overhead of the L1/L2 control channel, it is desirable to set a TTI with, as a unit, a period which is longer than a subframe length.

Moreover, another objective of the variable-length TTI is repeatedly transmitting the L1/L2 control channel within the TTI to increase the coverage of the L1/L2 control channel. In this case, it is desirable to set, as the TTI length, two to four subframes, for example.

In the evolved UTRA standardization, allocating a maximum of approximately 20 MHz as a transmission band is envisaged, which, when compared to HSDPA of approximately 5 MHz as a transmission band, causes the transmit data volume to vary by a factor of approximately 4 even for the same TTI. Thus, a loss in a case such that the L1/L2 control channel can not be received increases.

In this way, controlling the TTI length is common but the preferred TTI length varies from one objective to another.

Thus, the present invention, which is designed to overcome at least one of the problems as described above, aims to provide a base station, a mobile station, and a method of communicating that make it possible to control a TTI length according to the communications environment of a mobile station.

Means for Solving the Problem

In order to solve the problem as described above, a base station apparatus of the present invention includes:

a TTI-length determining unit which determines, based on downlink receive quality information transmitted from a mobile station, whether data is to be transmitted in a first TTI with, as a unit, a predetermined period no shorter than a subframe length, or in a second TTI with, as a unit, a period shorter than the first TTI;

a number-of-subframes determining unit which determines a number of subframes making up the determined TTI;

a reporting unit which reports the determined TTI and the number of subframes making up the determined TTI to the mobile station; and a scheduler which performs scheduling based on the determined TTI and the number of subframes making up the determined TTI.

Configuring in this way makes it possible to make, according to the communications environment of a mobile station, proper use of a TTI which is set with, as a unit, a period longer than a subframe length for reducing the overhead of a L1/L2 control channel, and a TTI which is set with, as a unit, two to four subframes for increasing the coverage of the L1/L2 control channel.

A mobile station apparatus of the present invention includes:

a receiving unit which receives a TTI and a number of subframes making up the TTI that are reported from a base station apparatus wherein it is determined whether data is to be transmitted in a first TTI with, as a unit, a predetermined period no shorter than a subframe length, or in a second TTI with, as a unit, a period shorter than the first TTI, a number of subframes making up the determined TTI is determined, and the determined TTI and the number of subframes making up the determined TTI is reported to the mobile station; and a decoding unit which decodes a shared data channel which is transmitted from the base station apparatus based on the reported TTI and the number of subframes making up the TTI.

In this way, data transmitted in a TTI which is determined according to the communications environment may be demodulated.

The method of communicating according to the present invention includes:

a TTI-length determining step of determining, by a base station apparatus, whether data is to be transmitted in a first TTI with, as a unit, a predetermined period no shorter than a subframe length, or in a second TTI with, as a unit, a period shorter than the first TTI, based on downlink receive quality transmitted from a mobile station apparatus;

a number-of-subframes determining step of determining, by the base station apparatus, a number of subframes making up the determined TTI;

a reporting step of reporting, by the base station apparatus, the determined TTI and the number of subframes making up the determined TTI to the mobile station apparatus;

a scheduling step of performing, by the base station apparatus, scheduling based on the determined TTI and the number of subframes making up the determined TTI;

a receiving step of receiving, by the base station apparatus, the reported TTI and the number of subframes making up the TTI; and a decoding step of decoding, by the mobile station apparatus, a shared data channel which is transmitted from the base station based on the reported TTI and the number of subframes making up the TTI.

In this way, it is made it possible for a base station to make, according to the communications environment of a mobile station, proper use of a TTI which is set with, as a unit, a period longer than a subframe length for reducing the overhead of a L1/L2 control channel, and a TTI which is set with, as a unit, two to four subframes for increasing the coverage of the L1/L2 control channel, and for a mobile station to demodulate data transmitted in a TTI which is determined according to the communications environment.

Advantage of the Invention

The embodiments of the present invention make it possible to implement a base station, a mobile station, and a method of communicating that make it possible to control a TTI length according to the communications environment of a mobile station.

DESCRIPTION OF THE PREFERRED EMBODIMENTS

Description of Notations

100 Base station apparatus; 200 Mobile station apparatus

BEST MODE OF CARRYING OUT THE INVENTION

A description is given below with regard to preferred embodiments of the present invention.

Throughout the drawings for explaining the embodiments, same letters are used for those having the same functions, so that repetitive explanations are omitted.

A wireless communications system according to an embodiment of the present invention is described below.

The wireless communications system according to the present embodiment includes a base station 100 and a mobile station 200.

In the wireless communications system according to the present embodiment, multiple types of TTI-length sets are provided in advance according to the objective, so that proper use is made of them according to the communications environment of the mobile station 200. In other words, as shown in FIG. 1, proper use is made of a TTI which is set with, as a unit, a period longer than a subframe length for reducing the overhead of a L1/L2 control channel (below called "the TTI for reducing the overhead"), and a TTI, as shown in FIG. 2, which is set with, as a unit, two to four subframes for increasing the coverage of the L1/L2 control channel (below called "the TTI for increasing the coverage").

Figure 1:
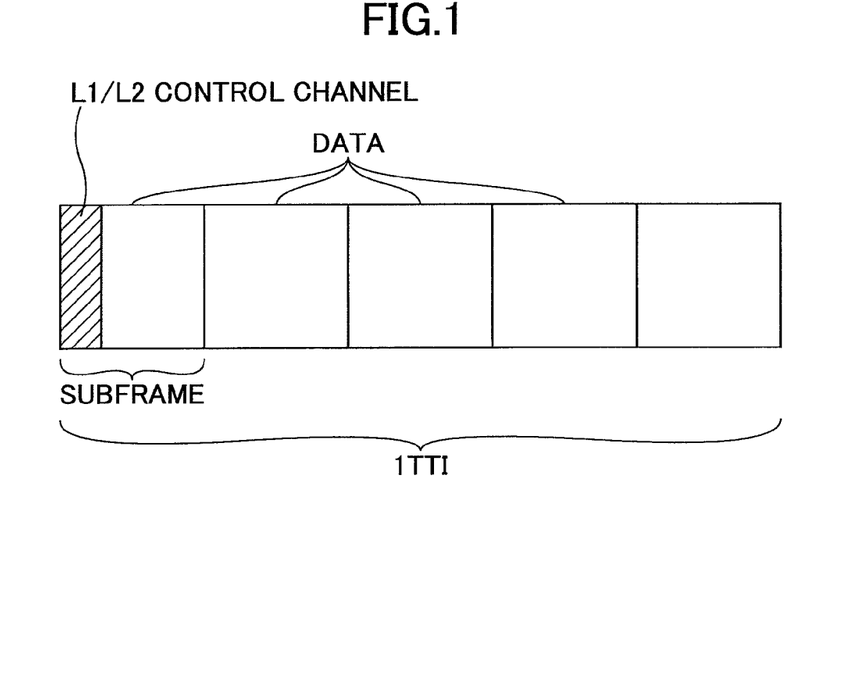
FIG. 1 is an explanatory drawing illustrating a TTI for reducing the overhead of an L1/L2 channel.
Figure 2:
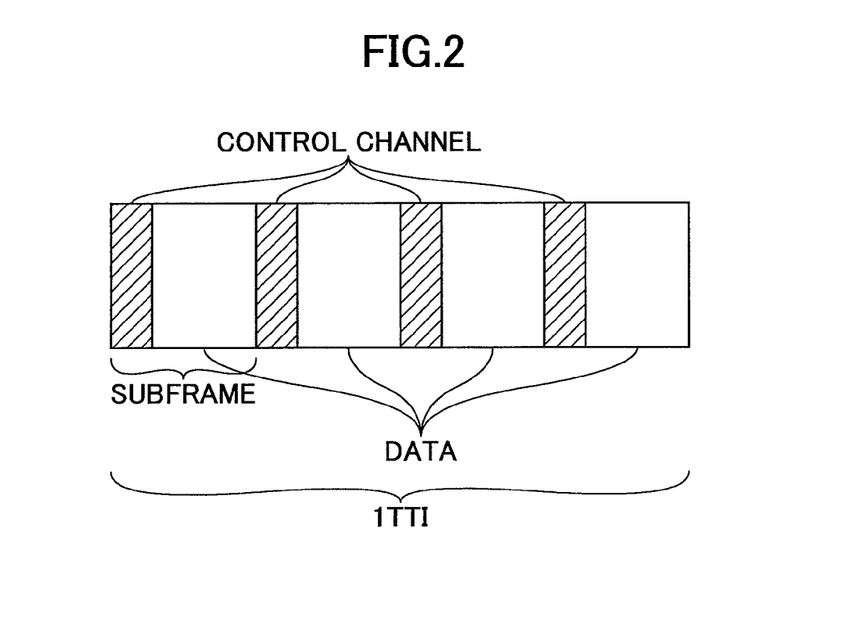
FIG. 2 is an explanatory diagram illustrating a TTI for increasing the coverage of the L1/L2 channel.

FIG. 1 shows, as an example, a TTI for reducing the overhead in which five subframes make up the TTI, while FIG. 2 shows a TTI for increasing the coverage in which four subframes make up the TTI.

A base station 100 according to the embodiment of the present invention is explained with reference to FIG. 3.

Figure 3:
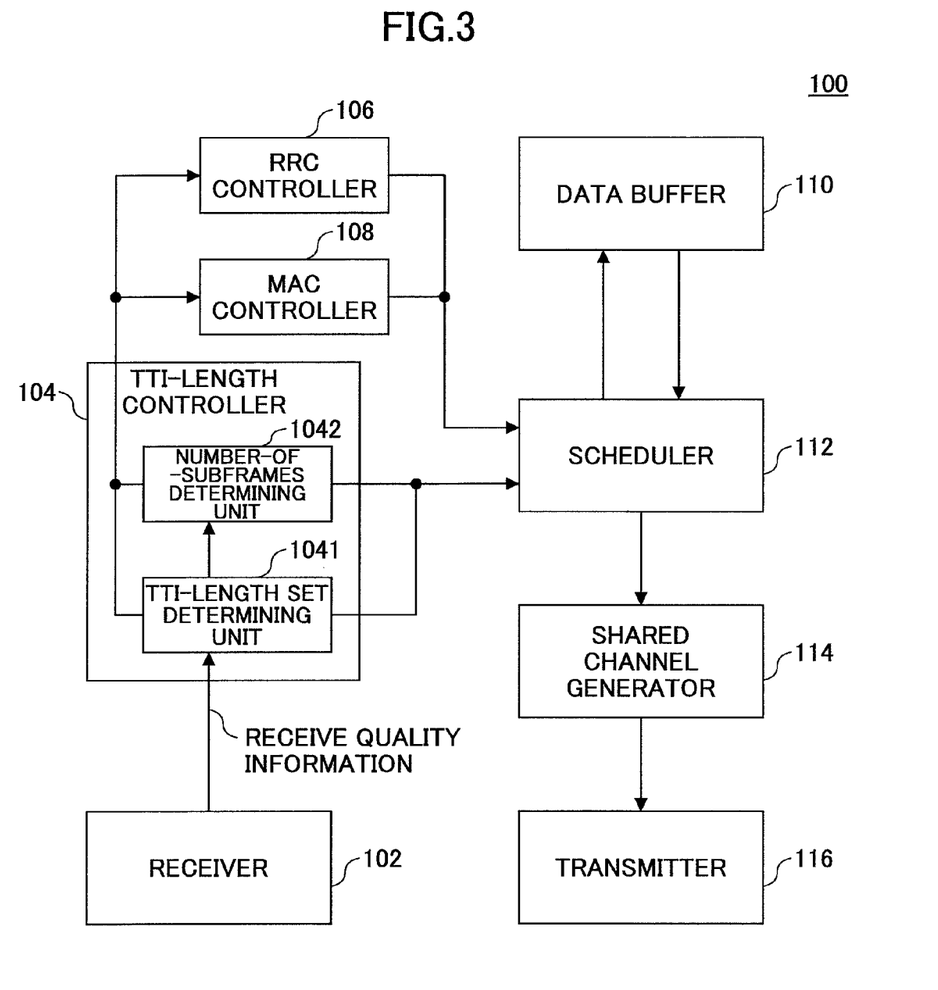
FIG. 3 is a partial block diagram illustrating a base station apparatus according to an embodiment of the present invention.

The base station 100, as illustrated in FIG. 3, includes a receiver 102, a TTI-length controller 104, an RRC controller 106, a MAC controller 108, a data buffer 110, a scheduler 112, a shared channel generator 114, and a transmitter 116. The TTI-length controller 104 includes a TTI-length set determining unit 1041 and a number-of-subframes determining unit 1042.

The receiver 102 receives downlink receive quality information (e.g., receive SIR) transmitted from a mobile station 200, and inputs the received information to the TTI-length controller 104. Moreover, the receiver 102 may be arranged to receive CQI transmitted from the mobile station 200, and inputs the received CQI to the TTI-length controller 104, or may be arranged to receive a number of errors or an error rate of a L1/L2 control channel that is transmitted from the mobile station 200, and inputs the received number of errors or the error rate to the TTI-length controller 104.

CQI means information indicating the quality of a wireless channel. For example, the base station 100 transmits a pilot signal, which the mobile station 200 receives and measures a receive SIR thereof. In this case, the mobile station 200 quantizes the measured receive SIR into 32 values, which quantized values are transmitted to the base station 100.

The TTI-length controller 104 determines, based on the receive quality information or the number of errors or the error rate of the L1/L2 control channel that is input, the TTI length of data to be transmitted to the mobile station 200. For example, TTI-length sets are set in advance in the TTI-length controller 104.

Figure 4:
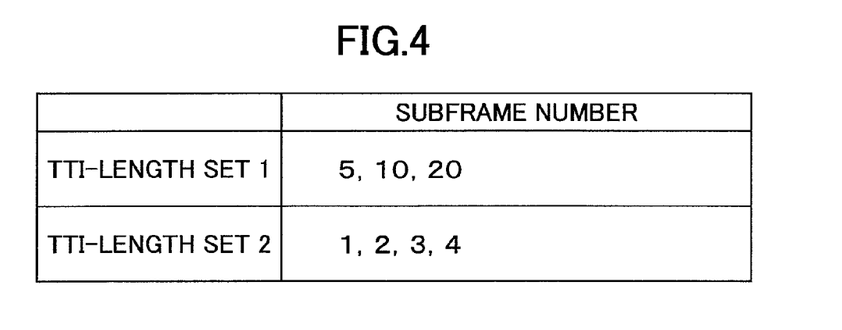
FIG. 4 is an explanatory diagram illustrating an example of TTI-length sets.

For the TTI-length sets, as shown in FIG. 4, the number of subframes in a TTI for reducing the overhead (a TTI-length set 1) and the number of subframes in a TTI for increasing the coverage (a TTI-length set 2) are set. FIG. 4 shows 5, 10 and 20 being set as the number of subframes in the TTI for reducing the overhead and 1, 2, 3 and 4 being set as the number of subframes in the TTI for increasing the coverage.

While a case of 2 types of TTI sets being set in advance is described in the embodiment of the present invention, 3 or more of the TTI set types may be applied. Moreover, the number of subframes making up a TTI are merely exemplary, so that the number of subframes other than those shown may be applied.

In a TTI-length set determining unit 1041, it is determined, based on input receive quality information, as to whether a mobile station which transmitted the receive quality information or the number of errors or the error rate of the L1/L2 control channel is located where it can receive the L1/L2 control channel at the required quality in an area covered by the own station. For example, the TTI-length set determining unit 1041 estimates, based on a predetermined threshold, whether the mobile station is located where it can receive the L1/L2 control channel at the required quality.

In particular, when the receive quality is no less than the predetermined threshold, it is determined that the mobile station is located where it can receive the L1/L2 control channel at the required quality, while, when the receive quality is less than the predetermined threshold, it is determined that the mobile station is not located where it can receive the L1/L2 control channel at the required quality.

Moreover, in the TTI-length set determining unit 1041, when the number of errors or the error rate of the L1/L2 control channel is less than the predetermined threshold, it may be determined that the mobile station is located where it can receive the L1/L2 control channel at the required quality, while, when the number of errors or the error rate of the L1/L2 control channel is no less than the predetermined threshold, it may be determined that the mobile station is not located where it can receive the L1/L2 control channel at the required quality.

As a result, in the TTI-length set determining unit 1041, when it is determined that the mobile station is located where it can receive the L1/L2 control channel at the required quality, it is determined to use the TTI-length set 1, while, when it is determined that the mobile station is not located where it can receive the L1/L2 control channel at the required quality, it is determined to use the TTI-length set 2. The TTI-length set determining unit 104 inputs, to a number-of-subframes determining unit 1042, information indicating the TTI-length set 1 or TTI-length set 2.

The number-of-subframes determining unit 1042 determines the number of subframes making up the TTI, based on information indicating the TTI-length set 1 or 2 that is input by the TTI-length set determining unit 1041.

For example, when the information indicating the TTI-length set 1 is input by the TTI-length set determining unit 1041, the number-of-subframes determining unit 1042 determines the number of subframes making up the TTI from 5, 10, and 20, which are set in advance for the TTI-length set. For example, the number-of-subframes determining unit 1042 determines, based on the communications traffic type and required QoS, the number of subframes making up the TTI.

In particular, the number of subframes making up a TTI is determined based on the QoS condition with respect to the delay such that, when the QoS condition is severe, the number of subframes making up the TTI is decreased, while, when the QoS condition is not severe, the number of subframes making up the TTI is increased.

Moreover, in the number-of-subframes determining unit 1042, when the information indicating the TTI-length set 2 is input by the TTI-length set determining unit 1041, the number of subframes making up the TTI is determined from 1, 2, 3, and 4, which are set in advance for the TTI-length set.

For example, the number-of-subframes determining unit 1042 determines, based on the receive quality, the number of subframes making up the TTI. In particular, when the receive quality is no more than a predetermined threshold, the number of subframes making up the TTI is increased. As a result, it is made possible for a mobile station to combine L1/L2 control channels transmitted using multiple subframes, and the coverage of areas covered by the base station to be increased.

Information indicating the TTI-length set and the number of subframes making up one TTI that is determined by the TTI-length set determining unit 1041 and the number-of-subframes determining unit 1042 is input to the RRC controller 106, the MAC controller 108, and the scheduler 112.

In the scheduler 112, scheduling is performed for allocating radio resources to each user in order to transmit data stored in the data buffer 110. For example, the scheduler 112 performs, based on information indicating the TTI-length set and the number of subframes making up one TTI that is input by the TTI-length controller 104, control of allocating, to one mobile station, a TTI which is made up of multiple subframes.

When communications are initiated, for example, the RRC controller 106 reports the TTI-length set to the mobile station using upper layer signaling (for example, RRC (Radio Resource Control)).

Moreover, the RRC controller 106 reports, to the mobile station, information indicating the number of subframes making up the TTI determined by the number-of-subframes determining unit 1042. In this case, the RRC controller 106 may be arranged to report, to the mobile station, information indicating the type of the TTI-length set determined by the TTI-length set determining unit 1041, or in other words, the TTI-length set 1 or 2. In this way, when the numbers of subframes making up TTIs are such that the number of subframes making up a TTI for reducing the overhead has the same value as the number of subframes making up a TTI for increasing the coverage, a mobile station can determine whether the number of subframes making up the TTI is the number of subframes making up the TTI for reducing the overhead, or the number of subframes making up the TTI for increasing the coverage.

Moreover, the MAC controller 108 may be arranged to report as a MAC control unit, to the mobile station, information indicating the number of subframes making up the TTI determined by the number-of-subframes determining unit 1042. In this way, signaling by RRC may be eliminated. In this case, the MAC controller 108 may be arranged to report, to the mobile station, information indicating the type of the TTI-length set determined by the TTI-length set determining unit 1041, or in other words, the TTI-length set 1 or 2. In this way, when the numbers of subframes making up TTIs are such that the number of subframes making up a TTI for reducing the overhead has the same value as the number of subframes making up a TTI for increasing the coverage, a mobile station can determine whether the number of subframes making up the TTI is the number of subframes making up the TTI for reducing the overhead, or the number of subframes making up the TTI for increasing the coverage.

The Scheduler 112 instructs the shared channel generator 114 to transmit a shared channel. As a result, the shared channel is transmitted from the transmitter 116.

Figure 5:
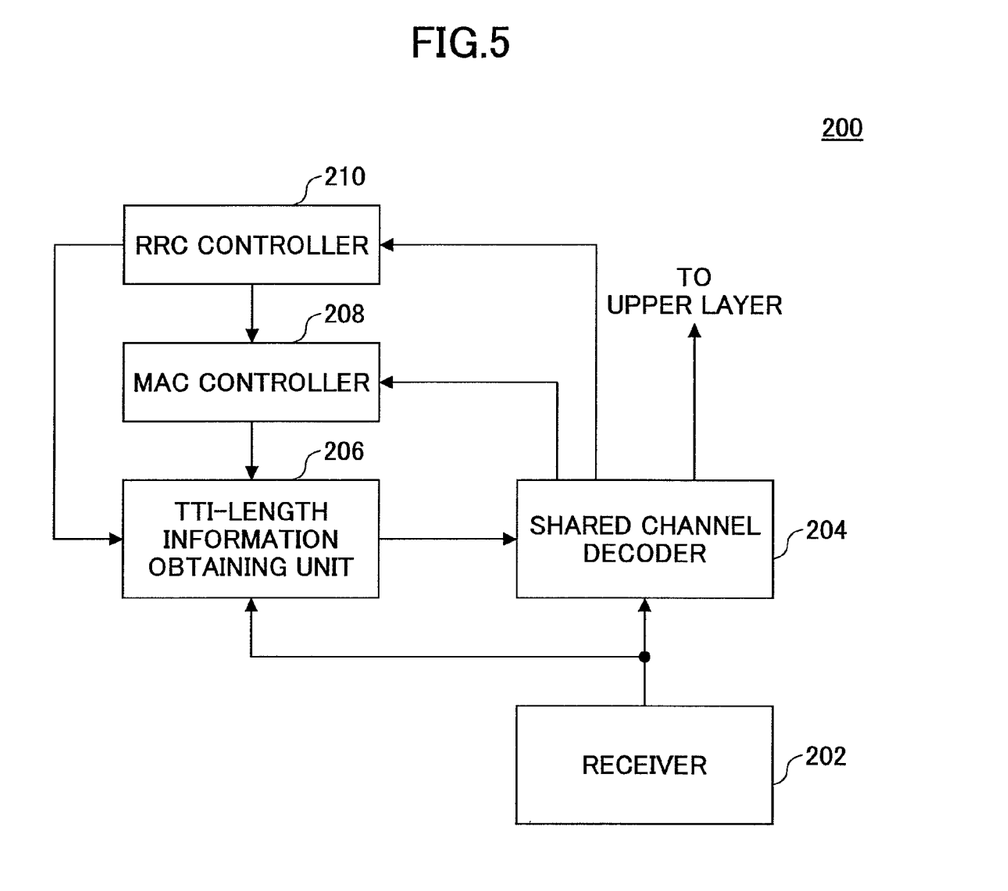
FIG. 5 is a partial block diagram illustrating a mobile station apparatus according to an embodiment of the present invention.

Next, a mobile station 200 according to the embodiment of the present invention is described with reference to FIG. 5.

The mobile station 200 includes a receiver 202, a shared channel decoder 204, a TTI-length information obtaining unit 206, a MAC controller 208, and an RRC controller 210.

The TTI-length set transmitted by the base station 100 using upper layer signaling is received by the receiver 202 and input to the RRC controller 210 via the shared channel decoder 204. The RRC controller 210 sets the TTI-length set to the TTI-length information obtaining unit 206.

Moreover, when the TTI-length set is transmitted by the base station 100 as a MAC control PDU, it is received by the receiver 202, and input to the MAC controller 210 via the shared channel decoder 204. The MAC controller 210 sets the TTI-length set to the TTI-length information obtaining unit 206.

Information indicating the number of subframes making up the TTI that is transmitted from the base station 100 is received by the receiver 202, and input to the TTI-length information obtaining unit 206. The TTI-length information obtaining unit 206 determines, based on information indicating the number of subframes making up the TTI, and the TTI-length set that are input, whether a shared data channel is transmitted with, as a unit, a TTI for reducing the overhead, or the shared data channel is transmitted with, as a unit, a TTI for increasing the coverage, and inputs the determined result, and the information indicating the number of subframes making up the TTI to the shared channel decoder 204.

Moreover, the receiver 202 receives the shared channel, and inputs the received channel to the shared channel decoder 204.

The shared channel decoder 204 decodes the input shared channel based on the TTI type, in other words, information indicating the TTI for reducing the overhead or the TTI for increasing the coverage, and the number of subframes making up the TTI so as to report the decoded result to the upper layer.

Figure 6:
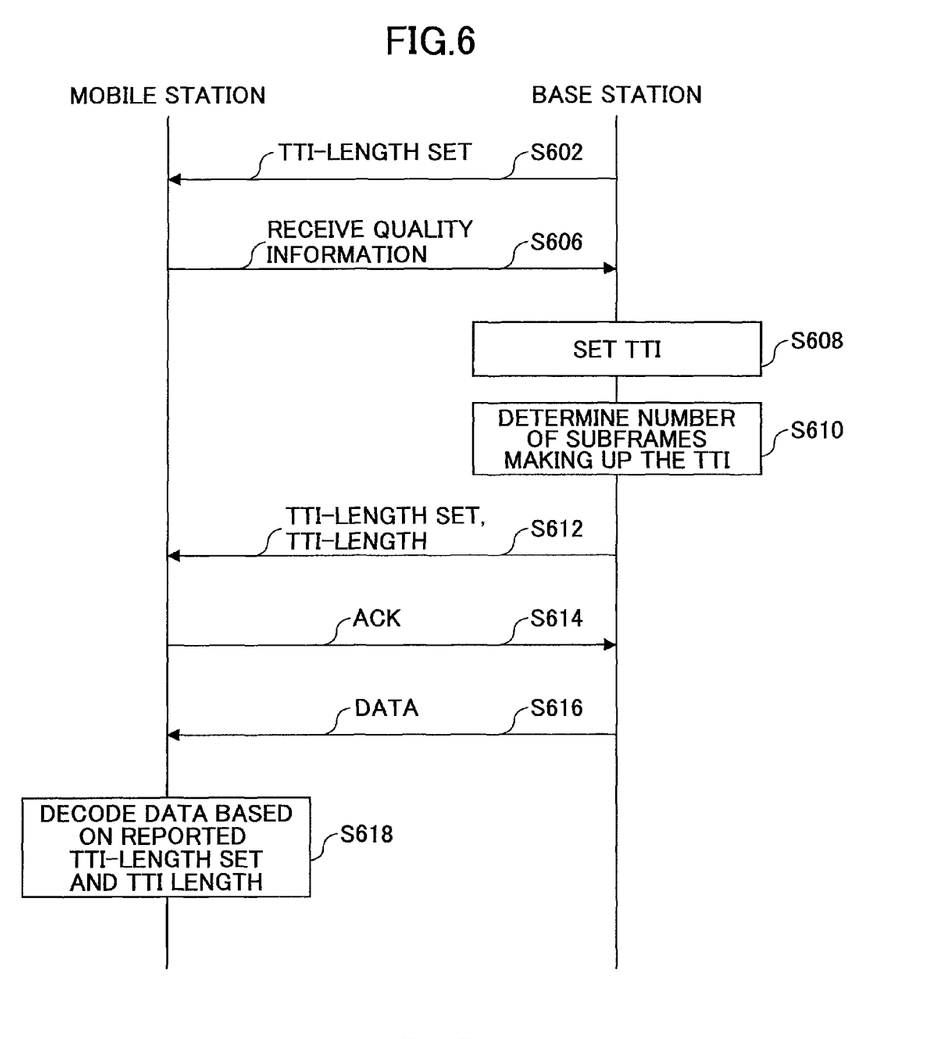
FIG. 6 is a flowchart showing an operation of a mobile communications system according to an embodiment of the present invention.

Next, a wireless communications system according to the embodiment of the present invention is described with reference to FIG. 6.

When communications are initiated, the base station 100 transmits, to the mobile station 200, the TTI-length set using upper-layer signaling (step S602).

The mobile station 200 transmits, to the base station 100, downlink receive quality information (using CQI, for example) (step S606). Moreover, mobile station 200 may measure the number of errors and the error rate of the L1/L2 control channel that are transmitted from the base station 100 and transmit, to the base station 200, the number of errors and the error rate in the L1/L2 control channel.

The base station 100, in the TTI-length controller 104, selects a TTI for reducing the overhead or a TTI for increasing the coverage based on information indicating the downlink receive quality transmitted from the mobile station 200, and determines the number of subframes making up the selected TTI (step S608).

Moreover, when the number of errors or the error rate of the L1/L2 control channel is transmitted from the mobile station 200, the TTI-length controller 104 may be arranged to select a TTI for reducing the overhead or a TTI for increasing the coverage based on the number of errors or the error rate of the L1/L2 control channel, and determine the number of subframes making up the selected TTI.

The base station 100 reports, to the mobile station 200, the determined TTI length (in other words, the TTI-length set 1 or 2), and the number of subframes making up the TTI (in other words, information indicating the TTI length) (step S612).

The mobile station 200, upon being able to receive the determined TTI length, and the information indicating the number of subframes making up the TTI, return an ACK thereto (step S614).

The base station 100 transmits the shared data channel (step S618).

The mobile station decodes data based on the reported TTI-length set and TTI length (step S618).

Figure 7:
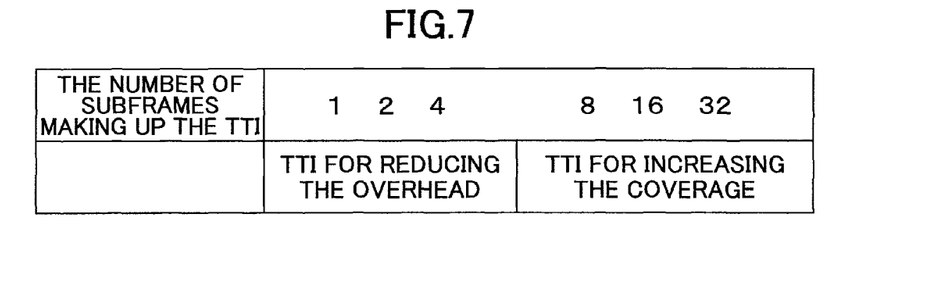
FIG. 7 is an explanatory diagram illustrating another example of the TTI-length sets.

In the embodiment as described above, a case in which information indicating the number of subframes making up a TTI, and information indicating the TTI-length set is reported is described. However, as shown in FIG. 7, it may be arranged for a threshold value to be set for the number of subframes making up the TTI, so that the TTI is determined in advance to be a TTI for increasing the coverage if the number is no less than the threshold value and a TTI for reducing the overhead if the number is less than the threshold value, and the number of subframes making up the determined TTI is reported. In this way, reporting of information indicating the TTI-length set may be omitted.

Moreover, the embodiment has been described in the above for controlling the TTI length for the downlink shared data channel. However, it is also applicable to controlling the TTI length for the uplink shared data channel.

Specific numerical value examples are used to facilitate understanding of the present invention. Such numerical values are merely exemplary, so that any appropriate value may be used.

As described above, while the present invention is described with reference to specific embodiments, the respective embodiments are merely examples, so that a skilled person will understand various variations, modifications, alternatives, and replacements. For convenience of explanation, while the apparatus according to the embodiments of the present invention is explained using functional block diagrams, the apparatus may be implemented in hardware, software, or a combination thereof. The present invention is not limited to the above embodiments, so that various variations, modifications, alternatives, and replacements are included in the present invention without departing from the spirit of the present invention.

The present international application claims priority based on Japanese Patent Application No. 2006-169446 filed on Jun. 19, 2006, the entire contents of which are hereby incorporated by reference.

The base station, mobile station, and method of communicating according to the present invention may be applied to wireless communications systems.

The invention claimed is:

1. A base station apparatus, comprising:
   a TTI-length determining unit which determines, based on a number of errors and/or an error rate of a L1/L2 control channel transmitted from a mobile station, whether data is to be transmitted in a first TTI with, as a unit, a predetermined period no shorter than a subframe length, or in a second TTI with, as a unit, a period shorter than the first TTI;
   a number-of-subframes determining unit which determines a number of subframes making up the determined TTI;
   a reporting unit which reports the determined TTI and the number of subframes making up the determined TTI to the mobile station; and
   a scheduler which performs scheduling based on the determined TTI and the number of subframes making up the determined TTI,
   wherein the TTI-length determining unit determines that, when the number of errors and/or the error rate of the L1/L2 control channel is no less than a predetermined threshold, the data is transmitted in the first TTI, and, when the number of errors and/or error rate of the L1/L2 control channel is less than the predetermined threshold, the data is transmitted in the second TTI.

2. The base station apparatus as claimed in claim 1, wherein
   the number-of-subframes determining unit, when it is determined by the TTI-length determining unit that the data is to be transmitted in the first TTI, determines the number of subframes making up the determined TTI based on QoS required for transmission data, and, when it is determined that the data is to be transmitted in the second TTI, determines the number of subframes making up the determined TTI based on the number of errors and/or the error rate of the L1/L2 control channel.

3. The base station apparatus as claimed in claim 1, wherein
the reporting unit reports by RRC (Radio Resource Control).

4. The base station apparatus as claimed in claim 1, wherein
the reporting unit reports by a MAC control PDU.

5. A mobile station apparatus, comprising:
a receiving unit which receives a TTI and a number of subframes making up the TTI that are reported from a base station apparatus wherein it is determined whether data is to be transmitted in a first TTI with, as a unit, a predetermined period no shorter than a subframe length, or in a second TTI with, as a unit, a period shorter than the first TTI, a number of subframes making up the determined TTI is determined, and the determined TTI and the number of subframes making up the determined TTI is reported to the mobile station; and
a decoding unit which decodes a shared data channel which is transmitted from the base station apparatus based on the reported TTI and the number of subframes making up the TTI,
wherein, when a number of errors and/or an error rate of a L1/L2 control channel is no less than a predetermined threshold, the data is transmitted in the first TTI, and, when the number of errors and/or error rate of the L1/L2 control channel is less than the predetermined threshold, the data is transmitted in the second TTI.

6. A method of communicating, comprising:
a TTI-length determining step of determining, by a base station apparatus, whether data is to be transmitted in a first TTI with, as a unit, a predetermined period no shorter than a subframe length, or in a second TTI with, as a unit, a period shorter than the first TTI, based on a number of errors and/or an error rate of a L1/L2 control channel transmitted from a mobile station apparatus;
a number-of-subframes determining step of determining, by the base station apparatus, a number of subframes making up the determined TTI;
a reporting step of reporting, by the base station apparatus, the determined TTI and the number of subframes making up the determined TTI to the mobile station apparatus;
a scheduling step of performing, by the base station apparatus, scheduling based on the determined TTI and the number of subframes making up the determined TTI;
a receiving step of receiving, by the base station apparatus, the reported TTI and the number of subframes making up the TTI; and a decoding step of decoding, by the mobile station apparatus, a shared data channel which is transmitted from the base station based on the reported TTI and the number of subframes making up the TTI,
wherein, when the number of errors and/or the error rate of the L1/L2 control channel is no less than a predetermined threshold, the data is transmitted in the first TTI, and, when the number of errors and/or error rate of the L1/L2 control channel is less than the predetermined threshold, the data is transmitted in the second TTI.

* * * * *